(12) United States Patent
Naber et al.

(10) Patent No.: US 9,869,333 B2
(45) Date of Patent: Jan. 16, 2018

(54) CONNECTOR FOR A PIECE OF FURNITURE (71) Applicant: Naber Holding GmbH & Co. KG, Nordhorn (DE)

(72) Inventors: Hans-Joachim Naber, Nordhorn (DE); Kilian Schindler, Karlsruhe (DE)

(73) Assignee: Naber Holding GmbH & Co. KG, Nordhorn (DE)

( * ) Notice: Subject to any disclaimer, the term of this patent is extended or adjusted under 35 U.S.C. 154(b) by 391 days.

(21) Appl. No.: 13/666,258

(22) Filed: Nov. 1, 2012

(65) Prior Publication Data
US 2013/0114998 A1   May 9, 2013

(30) Foreign Application Priority Data
Nov. 8, 2011 (DE) .............. 20 2011 107 600 U (51) Int. Cl.
| F16B 12/10 | (2006.01) |
| A47B 57/50 | (2006.01) |
| F16B 12/52 | (2006.01) |
| F16B 7/04 | (2006.01) |
| F16B 21/09 | (2006.01) |
| F16B 12/38 | (2006.01) |

(52) U.S. Cl.
CPC .............. *F16B 12/10* (2013.01); *A47B 57/50* (2013.01); *F16B 7/0446* (2013.01); *F16B 12/52* (2013.01); *F16B 21/09* (2013.01); *F16B 12/38* (2013.01); *Y10T 403/70* (2015.01)

(58) Field of Classification Search
CPC .......... F16B 12/10; F16B 12/52; F16B 12/38; F16B 12/32; F16B 12/34; A47B 57/50; Y10T 403/70

USPC .............. 211/187, 208; 108/147.12, 147.13, 108/147.14, 147.15
See application file for complete search history.

(56) References Cited

U.S. PATENT DOCUMENTS

| 2,939,589 A * | 6/1960 | Bellon ................... A47B 57/18 108/147.15 |
| 2,990,067 A * | 6/1961 | Bartlett ................. A47B 57/20 108/147.15 |
| 3,294,250 A * | 12/1966 | Evans .................... A47B 57/22 108/147.15 |
| 4,712,695 A * | 12/1987 | Cheng .................... F16B 12/32 211/182 |
| 4,892,044 A * | 1/1990 | Welsch .................. A47B 57/54 108/147.14 |
| 5,350,073 A * | 9/1994 | Thornley ............... A47B 57/22 108/107 |
| 7,568,436 B2 * | 8/2009 | McAllister ........... A47B 57/265 108/107 |

(Continued)

FOREIGN PATENT DOCUMENTS

DE        20213924       11/2002

*Primary Examiner* — Victor MacArthur
(74) *Attorney, Agent, or Firm* — Marshall & Melhorn, LLC (57) ABSTRACT

A connector for a piece of furniture comprises a connector body having a first end, and comprising a bearing element detachably connected with the connector body, the first end comprising a fastening section having a contact surface and the bearing element comprising a snap-lock element which extends with a free end thereof through the contact surface into the fastening section when the connector body engages the bearing element.

8 Claims, 8 Drawing Sheets

(56) References Cited

U.S. PATENT DOCUMENTS

| | | | |
|---|---|---|---|
| 2003/0085191 A1* | 5/2003 | Nakajima | A47B 13/003 211/186 |
| 2005/0056604 A1* | 3/2005 | Chen | A47B 57/40 211/182 |
| 2009/0113627 A1* | 5/2009 | Harrow | A47C 19/005 5/200.1 |
| 2010/0108631 A1* | 5/2010 | McAllister | A47B 57/545 211/187 |
| 2011/0180350 A1* | 7/2011 | Thacker | E04G 7/307 182/186.8 |

* cited by examiner

CONNECTOR FOR A PIECE OF FURNITURE

BACKGROUND OF THE INVENTION

The invention relates to a connector for a piece of furniture, in particular for mounting shelves or the like of a shelf system at a desired height at the corner poles of the shelf system.

From DE 202 13 924 U1, a bottom support device for shelves is known comprising a bottom support housing which is inserted into the end face of a shelf and which is embodied for receiving a bottom support post. The bottom support post can be inserted into a receiving bore arranged in the opposite furniture body, wherein the bottom support housing comprises a slit which is open to the bottom side of the shelf and extends parallel to the bottom carrier post, wherein a graduated cylindrical receiving region for the bottom support post is joined. The receiving region comprises an inner diameter which corresponds to the outer diameter of the received bottom support post. A slider which can be moved transversely to the end face of the shelf is seated at the bottom support housing which is configured to overlap and cover the slit.

It is the object of the invention to propose a connector for a piece of furniture which may be realized with technically simple means and which is easy to assemble.

SUMMARY OF THE INVENTION

According to the invention, this object is solved by a connector comprising a connector body and a bearing element which is detachably connected with the connector body. The connector body comprises a first end having a fastening section with a contact surface. The bearing element comprises a snap-lock element which extends with a free end thereof through the contact surface into the fastening section when the connector body engages the bearing element.

For joining the connector with a table leg, a shelf pole or the like, the bearing element with its snap-lock element can, in a first step, be inserted into a recess of for example a shelf pole. The reception of the shelf pole can be, for example, a vertical longitudinal hole which comprises a bulging for receiving the snap-lock element at its upper end. In this case, the snap-lock element may be a post having a head piece at a free end thereof which has a larger diameter than the remaining part of the post. In this way, the snap-lock element forms an undercut with the aid of the head piece thereof which can overlap the bordering sides of the longitudinal hole for fixing the bearing element at the shelf pole, after the head piece having been moved through the bulging of the longitudinal hole into the shelf pole and vertically along the longitudinal hole. After having joined the bearing element with the shelf pole as previously described, the bearing element can be joined to the connector body, wherein the contact surface of the fastening section is abutted to the outer surface of the shelf pole. By joining the bearing element and the connector body, the bearing element is tensioned within the groove of the shelf pole, since the connector body is supported at the shelf pole via the contact surface.

In a preferred embodiment, the connector body comprises a second end opposite the first end, the second end having an adapter for a hollow profile. Such a connector may for example be provided at the four corners of a shelf, wherein pairs of diametrically opposite connectors are connected by means of a respective hollow profile and can be supported by another. Preferably, this embodiment comprises two hollow profiles, wherein diametrically opposite connectors are respectively connected by a hollow profile. The adapter can be embodied arbitrarily and is not intended to be limited to specific adapters. In order to allow assembling to be as simple as possible, the adapter is preferably embodied as a releasable snap-lock element.

A particularly preferred adapter comprises at least one guiding surface along which the hollow profile can be slid on the adapter with an inner side or an outer side thereof, the adapter further comprising a bearing surface having a latch which snaps into a reception of the hollow profile when the hollow profile is slid onto the adapter.

An adequate configuration of the preferred embodiment comprises an adapter with a base, the base having a periphery which at least in sections positively contacts the inner side or the outer side of the hollow profile when the hollow profile is slid onto the adapter.

In an embodiment of the invention, the connector body comprises a first side configured as a supporting surface for a table top, a shelf or the like, and comprises a second side opposite the first side which sits on the bearing element when the bearing element is engaged by the connector body. It is preferred that the first and the second sides are at least in sections formed as parallel surfaces.

In order to produce a positive connection between the connector body and the bearing element, which on the one hand may be simply manufactured and which is also easily releasable, it is provided in the preferred embodiment that the second side of the connector body comprises a connecting pin extending through a passage opening of the bearing element, when the connector body engages the bearing element. Preferably, when engaging the connector body and the bearing element, they are clamped firmly together.

In an embodiment of the invention, the connector body comprises respectively at least one barb at opposite sides which is formed in the region between the first and the second end of the connector body and which free end extends towards the first end of the connector body. With the aid of the barbs, the connector can be supported, for example, at bends in the corner regions of a shelf, when the connector body is clamped firmly to the bearing element when inserting the shelf, as previously described. In place of the barbs, however, the connector can be bulged at the first and second sides and can comprise at least one bellied form.

In an embodiment of the invention, the function of the barbs is taken over by at least one bellied tab, at least one respectively being provided at each of the opposite sides of the connector body. Thus, the connector body comprises a dimension in the region of the opposite tabs which is larger than the maximum width of a recess of a shelf or the like into which the connector can be inserted.

BRIEF DESCRIPTION OF THE DRAWINGS

Exemplary embodiments of the invention are explained with the aid of the appended figures. It is shown in FIG. 1 the bearing element of a first embodiment of the connector according to the invention.

DETAILED DESCRIPTION OF THE INVENTION

Figure 1:
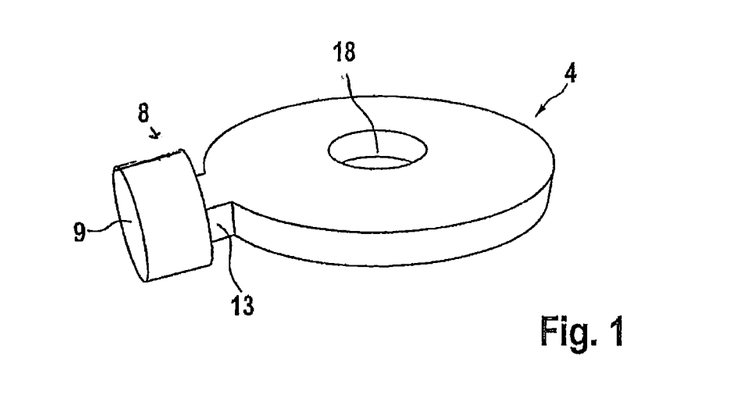

FIG. 1 shows a first embodiment of the bearing element 4 according to the invention. It comprises a snap-lock element 8 including a post 13 and a head piece at a free end 9 thereof which comprises a larger diameter compared to post 13 and thus forms an undercut.

Figure 2:
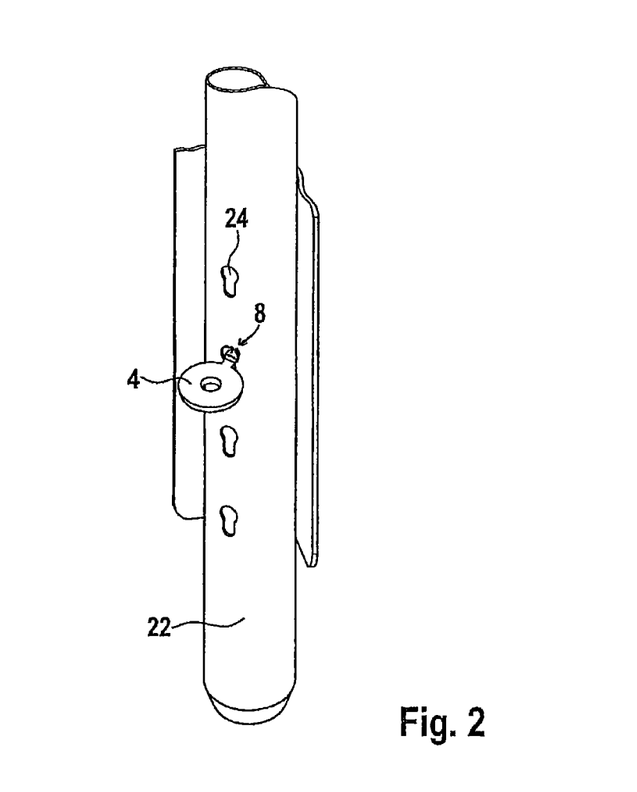
FIG. 2 the bearing element of FIG. 1 inserted into a table leg.
Figure 3A:
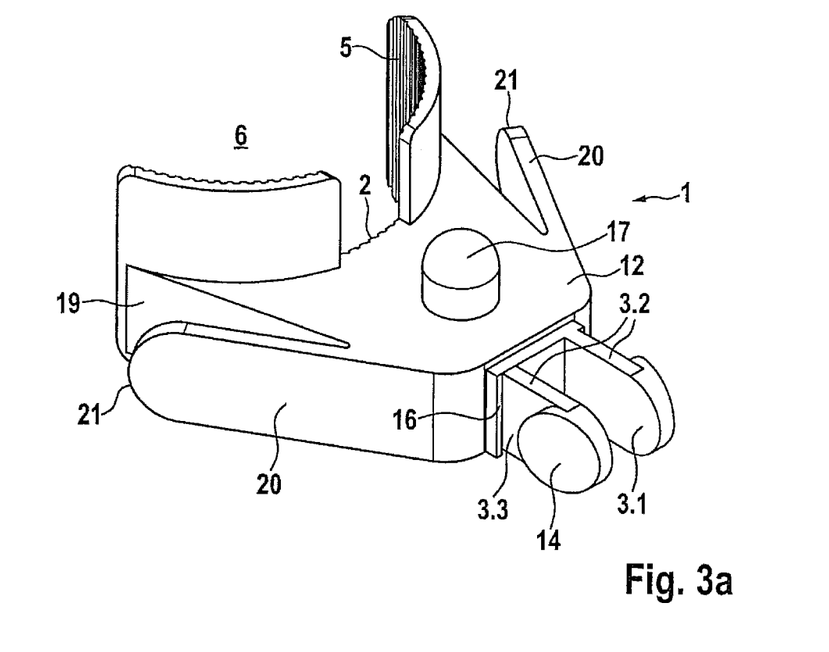
FIGS. 3a-3d four views of a connector body according to a first embodiment of the invention.
Figure 3B:
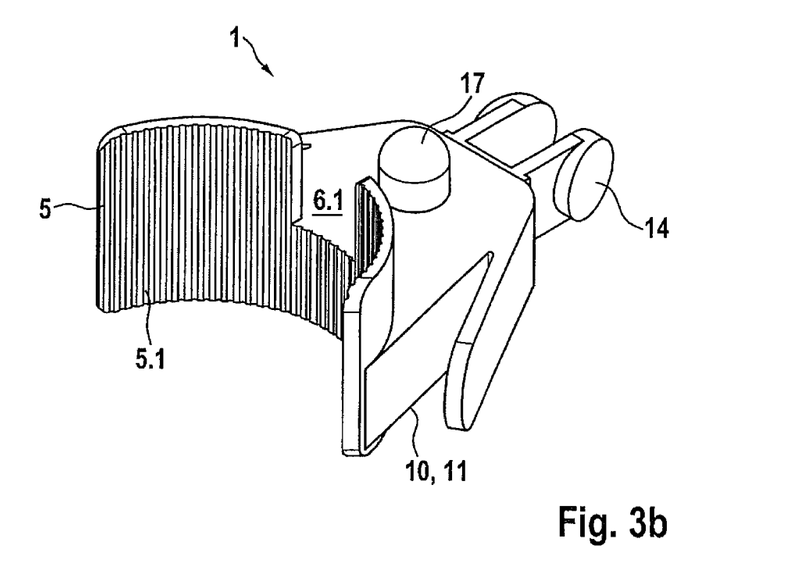
Figure 3C:
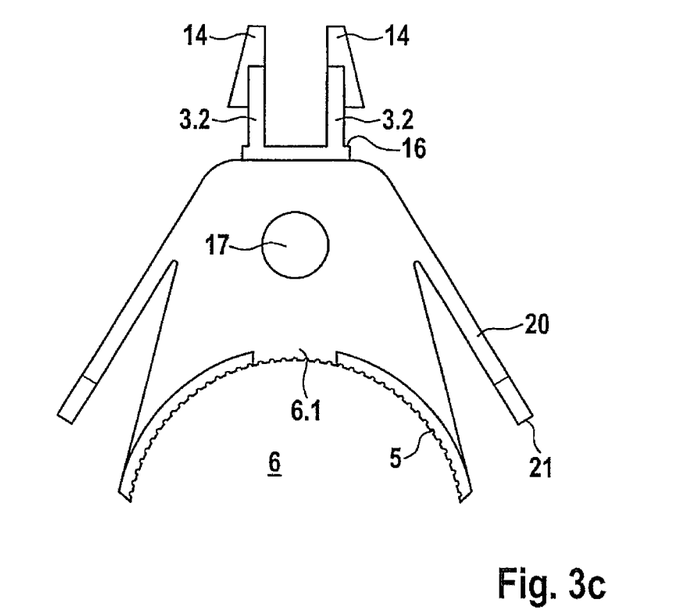
Figure 3D:
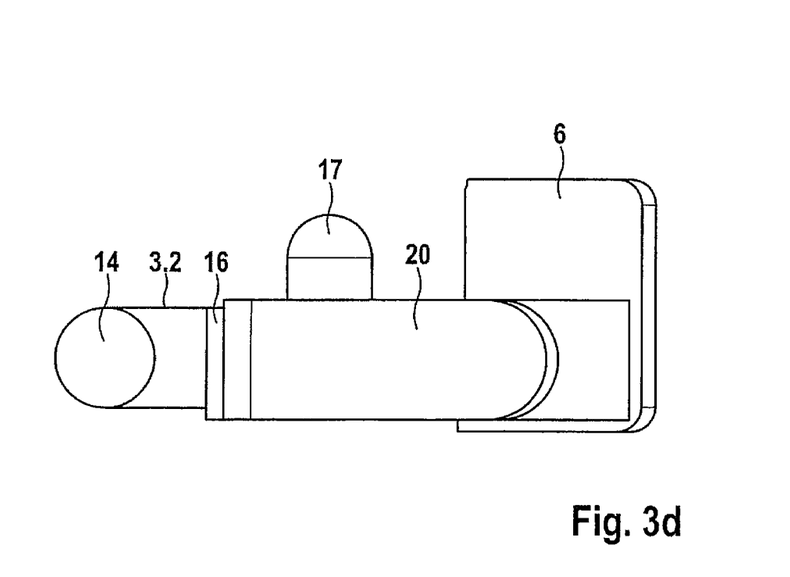
Figure 4A:
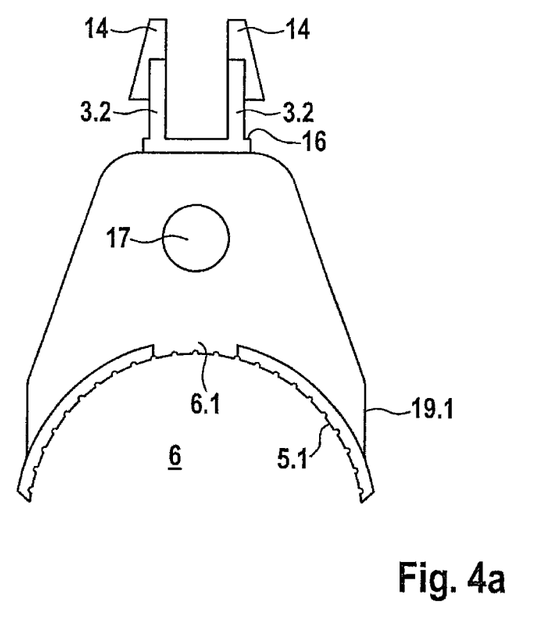
FIGS. 4a-4d four views of a second embodiment of the connector body according to the invention.
Figure 4B:
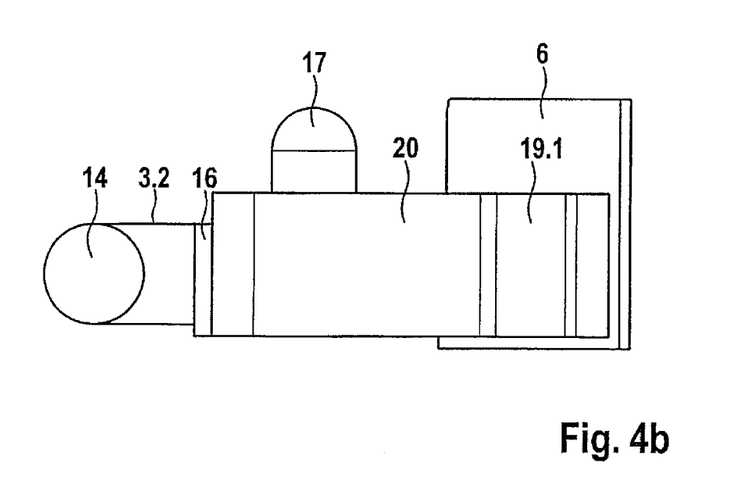
Figure 4C:
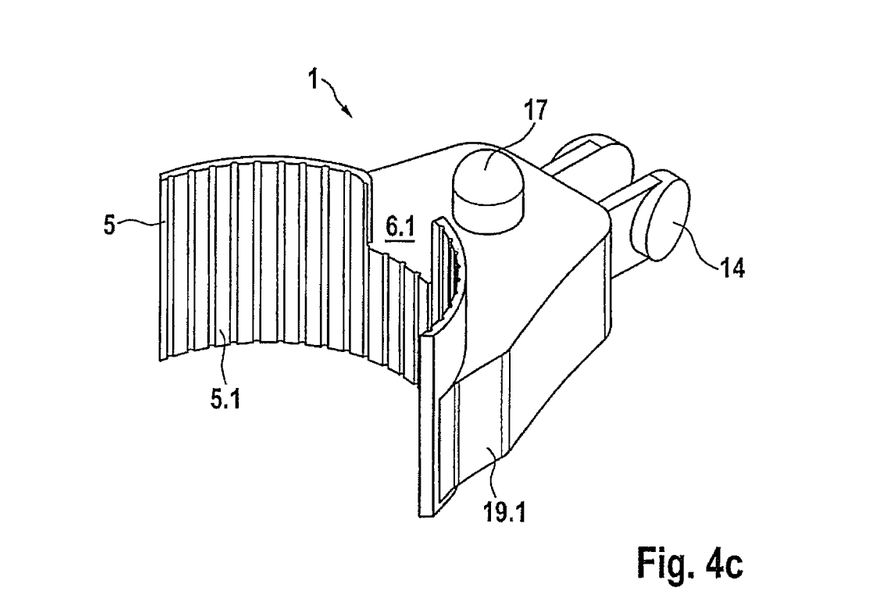
Figure 4D:
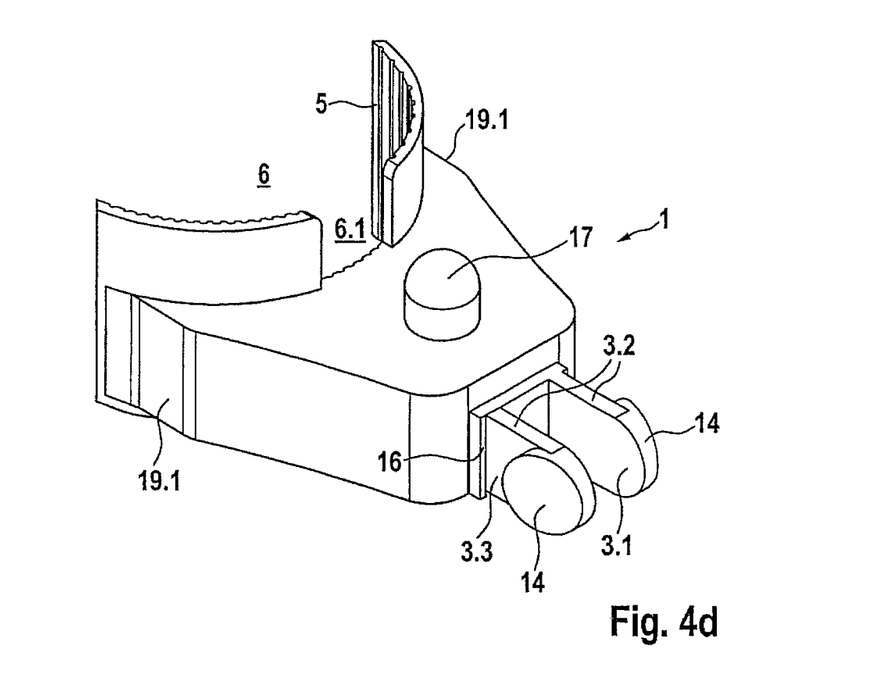

As illustrated in FIG. 2, the bearing element can be inserted, via an elongated hole 24 with a bulged upper inlet, into a leg element 22 configured as a hollow profile. As soon as the snap-lock element is inserted into the leg element 22 at least to an extent that its head piece at the free end 9 thereof is completely positioned in the interior of leg element 22, bearing element 4 can be displaced vertically along the bordering surfaces of longitudinal hole 24 vertically downwards. In a lower locking position, the head piece overlaps the hollow profile of leg element 22 from inside at the free end of bearing element 4, so that in this locking position a positive engagement between bearing element 4 and leg element 22 is provided.

In FIGS. 3a to 3d, a connector body 1 is illustrated which may be utilized in conjunction with bearing element 4 of FIGS. 1 and 2. It comprises a first end 2 having a fastening section 6 comprising a contact surface 5. In order to improve contact with a table leg or the like, contact surface 5 comprises a profile 5.1. Contact surface 5 is disrupted by a passage 6.1. Connector body 1 comprises a second end 3 opposite the first end 2 which has an adapter 3.1. Adapter 3.1 is configured to engage a hollow profile interiorly by sliding it over adapter 3.1. To this end, adapter 3.1 comprises guiding surfaces 3.2 along which the hollow profile, not illustrated, may be slid onto the adapter along its inner side. Furthermore, adapter 3.1 comprises bearing surfaces 3.3 at opposite sides of a flexible latch 14 which snaps into a passage from the inner side of the hollow profile when the hollow profile is slid onto adapter 3.1. As may be best seen in FIG. 3c, the outer sides of latches 14 facing away from each other approach towards their free ends and respectively form an undercut at their ends facing away from the free end. Adapter 3.1 further comprises a base 16 having a periphery which at least in sections positively contacts the inner side of the hollow profile when the hollow profile is slid onto adapter 3.1. Connector body 1 comprises respectively a barb 20 at opposite sides 19 which is formed in the region between the first and the second end 2, 3 of the connector body and which free end 21 extends towards the first end 2 of connector body 1.

In FIGS. 4a to 4d, a second embodiment of the connector body 1 according to the invention is illustrated. It distinguishes from that illustrated in FIGS. 3a-3d in that a bellied tab 19.1 or a bellied form is provided in place of the respective barbs 20 at opposite sides 19. Bellied tabs 19.1 serve to clamp connector body 1 to a shelf or the like. The functioning of bellied tabs 19.1 is explained in detail with reference to FIGS. 5 to 7. Apart from that, the connector body of FIGS. 4a to 4d is not different from the embodiment of FIGS. 3a to 3d.

Figure 5:
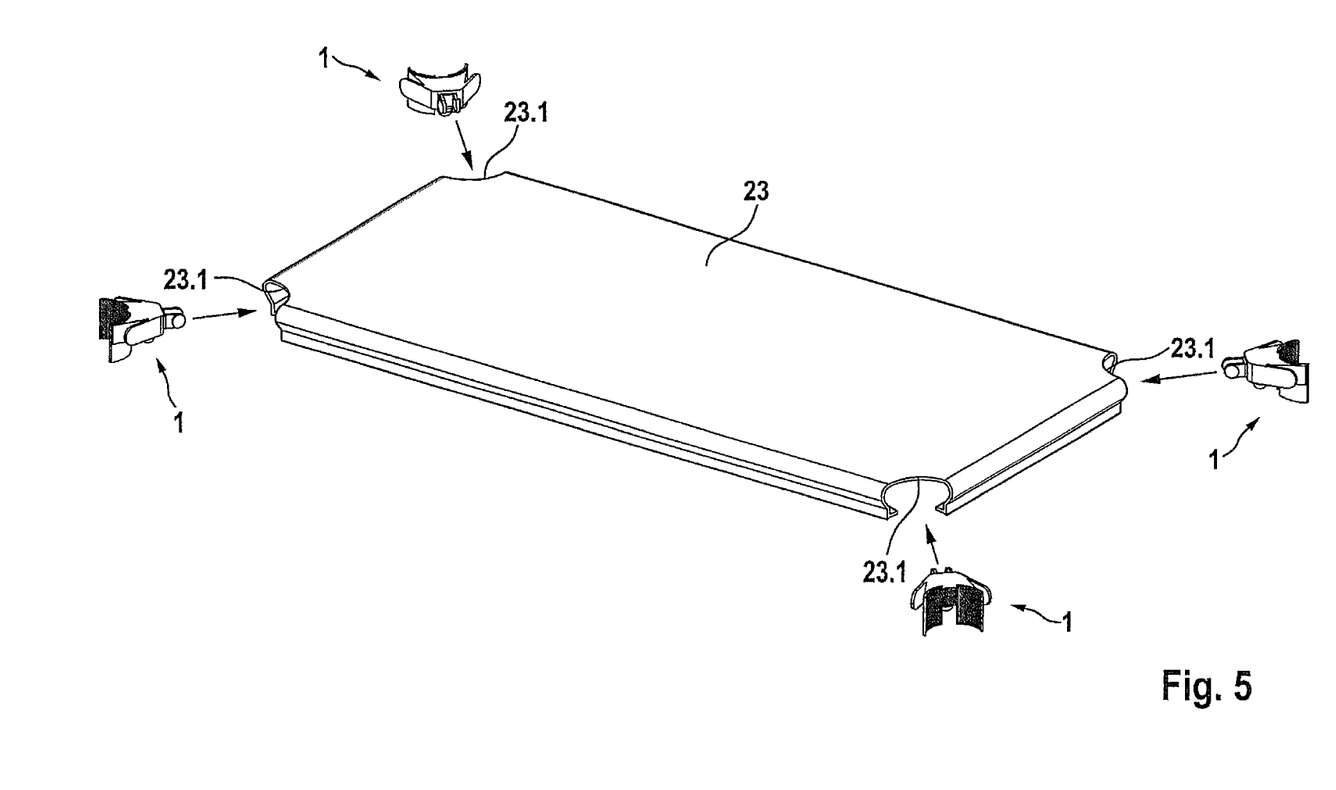
FIG. 5 a shelf having a respective connector body at each of the corners thereof.
Figure 6:
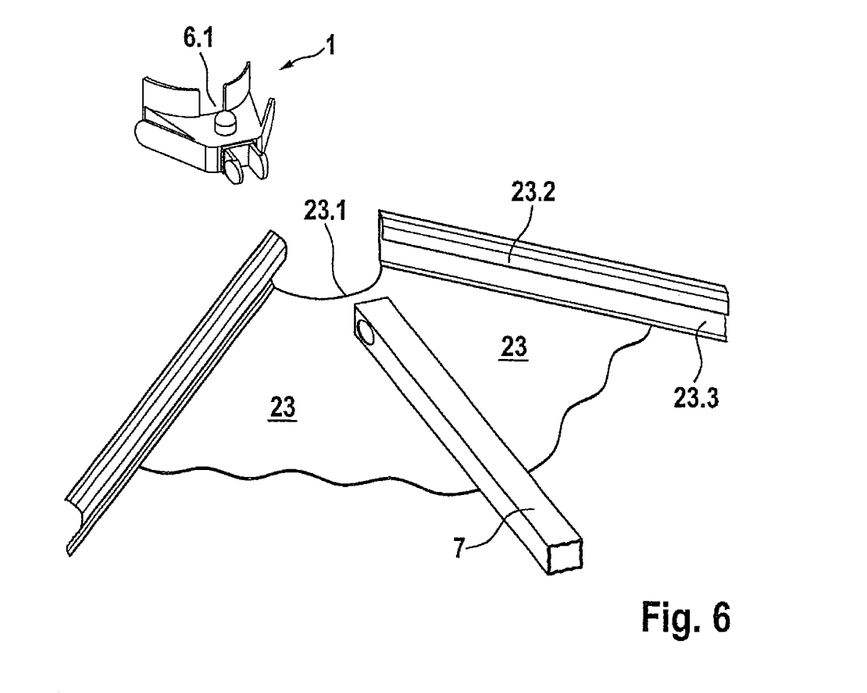
FIG. 6 a detailed view of the bottom side of the shelf of FIG. 5 in the corner region.
Figure 7:
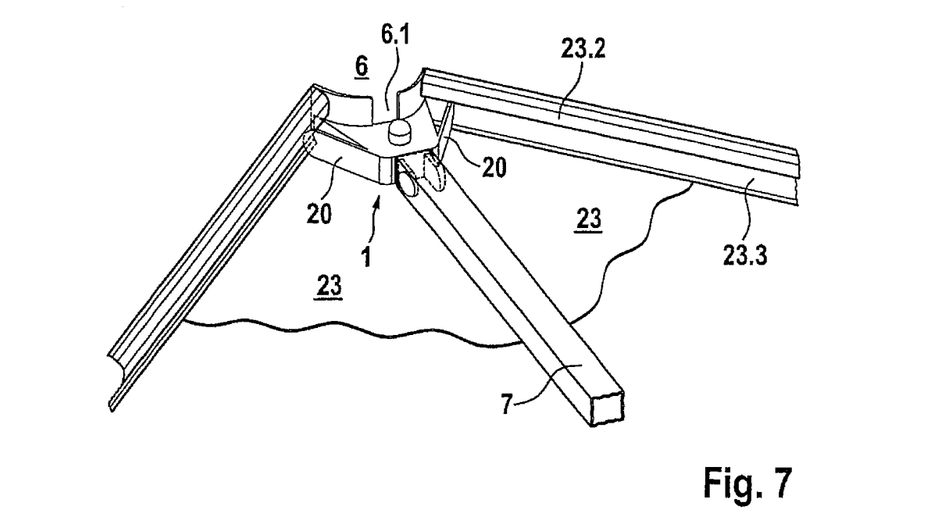
FIG. 7 a detailed view according to FIG. 6 of the connector body attached to the corner region of the shelf.
Figure 8:
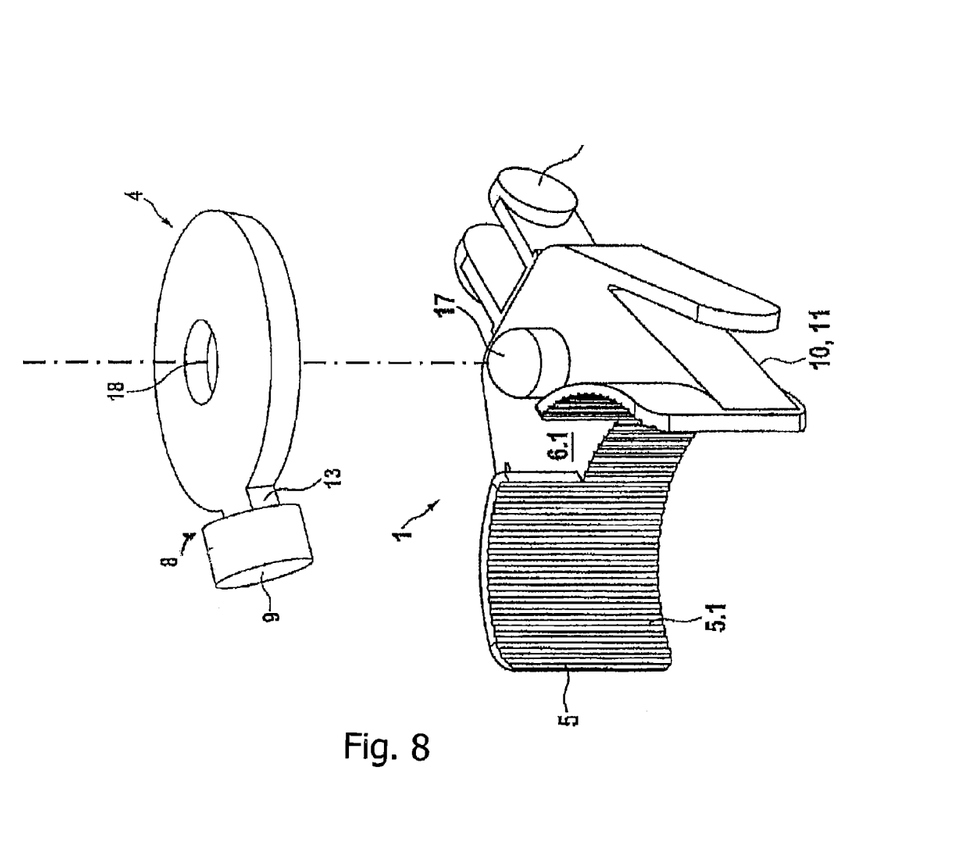
FIG. 8 a view of the bearing element of FIG. 1 detachably connected to the connector body of FIGS. 3a-3d.

With reference to FIGS. 5 to 7, mounting of connector body 1 to a shelf 23 or a table top is illustrated. Rectangular shelf 23 preferably comprises a recess 23.1 at each of its corners in which connector body 1 can be received. Preferably, connector body 1 and recesses 23.1 are mating such that contact surface 5 of connector body 1 directly adjoins an outer rim of shelf 23 in a corner region thereof and thus provides a continuous rim of the shelf, wherein a fastening section 6 (see FIG. 3) is formed in the corner region of shelf 23 with the aid of connector body 1. In an inserted state (see FIG. 7), the free ends 21 of barbs 20 abut at the inner sides of bends 23.2 which form the edge region of shelf 23. Preferably, barbs 20 are seated in receptions 23.3 which are formed at the inner side of bends 23.2. As a consequence, connector body 1 is secured also against undesired sliding perpendicular to the bottom surface of shelf 23 in the inserted state. In place of barbs 20, connector body 1 may also comprise a bellied tab 19.1 at opposite sides as illustrated in FIGS. 4a to 4d, which effects clamping of connector body 1 between vertical bends 23.2 of shelf 2 in the corner regions thereof. Contact surface 5 of connector body 1 is disrupted by a passage 6.1 upstream connecting pin 17. Snap-lock element 8 of bearing element 4 extends through contact surface 5 such that its free end 9 is in the into fastening section 6, when connector body 1 is engaged with pre-assembled bearing element 4, as illustrated in FIG. 8.

A transverse brace fabricated from a hollow profile 7 is, at one end thereof, connected with a first connector body 1 via the adapter 3.1 thereof and, at a second end thereof, connected with a connector body 1 diametrically opposite to first connector body 1.

If at each corner of shelf 23 a connector body 1 is pre-mounted and connected with a diametrically opposite connector body 1, by means of a hollow profile 7, as previously described, shelf 23 can be inserted into a table or shelf rack, which is pre-assembled, as shown in FIG. 2. Shelf 23 is preferably mounted to the upper ends of table legs 22 or shelf poles, respectively, so that contact surfaces 5 of connector body 1 are contacting the outer contour of the respectively associated leg element. Depending on the height of leg elements 22 where bearing elements 4 are pre-mounted, shelf 23 is lowered along the outer contours of leg elements 22 along contact surfaces 5, until connecting pin 17 meets passage opening 18 of bearing element 4, extends therethrough and seats side 12 of connector body 1 on bearing element 4. It may be provided that, while extending connecting pin 17 through passage opening 18 of bearing element 4, a clamping between bearing element 4 and connector body 1 and accordingly between connector body 1 and leg element 2 is produced for producing a positive connection between shelf 23 and the relevant leg element 22.

The features of the invention disclosed in the previous description, in the drawings or in the claims may be both individually and in any combination material for realizing the invention.

What is claimed is:

1. A connector for a piece of furniture, comprising a connector body having a first end, and comprising a bearing element detachably connected with the connector body, the first end comprising a fastening section having a contact surface and the bearing element comprising a snap-lock element which extends with a free end thereof through the contact surface into the fastening section when the connector body engages the bearing element, wherein the connector body comprises a second end opposite the first end, the second end having an adapter for a hollow profile, wherein the adapter comprises at least one guiding surface along which the hollow profile can be slid on the adapter with an inner side or an outer side thereof, the adapter further comprising a bearing surface having a latch which snaps into a reception of the hollow profile when the hollow profile is slid onto the adapter, wherein the connector body comprises a first side configured as a supporting surface for a table top, a shelf or the like, and comprises a second side opposite the first side which sits on the bearing element when the bearing element is engaged by the connector body, and wherein the snap-lock element of the bearing element comprises a post having a head element with an undercut at a free end thereof.

2. The connector of claim 1, wherein the adapter comprises a base, the base having a periphery which at least in sections positively contacts the inner side or the outer side of the hollow profile when the hollow profile is slid onto the adapter.

3. The connector of claim 1, wherein the second side of the connector body comprises a connecting pin extending through a passage opening of the bearing element when the connector body engages the bearing element.

4. The connector of claim 1, wherein the contact surface conforms to the outer contour of a table leg or a shelf pole.

5. The connector of claim 1, wherein the connector body comprises at opposite sides respectively at least one barb which is formed in the region between the first and the second end of the connector body and which free end extends towards the first end of the connector body.

6. The connector of claim 1, wherein the connector body comprises at opposite sides respectively at least one bellied tab, wherein the connector body comprises a dimension in the region of the opposite tabs which is larger than the maximum width of a recess of a shelf or a table top into which the connector can be inserted.

7. The connector according to claim 1, wherein the contact surface comprises a hole for receiving the snap lock element.

8. The connector according to claim 7, wherein the hole for receiving the snap lock element comprises a wider section and a narrower section, wherein the wider section is larger than the head element of the snap lock element, and the narrower section is narrower than the head element of the snap lock section.

* * * * *